(12) United States Patent
Anderson et al.

(10) Patent No.: US 12,438,892 B2
(45) Date of Patent: *Oct. 7, 2025

(54) CORRELATING ENDPOINT AND NETWORK VIEWS TO IDENTIFY EVASIVE APPLICATIONS

(71) Applicant: Cisco Technology, Inc., San Jose, CA (US)

(72) Inventors: Blake Harrell Anderson, Chapel Hill, NC (US); David McGrew, Poolesville, MD (US); Vincent E. Parla, North Hampton, NH (US); Jan Jusko, Prague (CZ); Martin Grill, Prague (CZ); Martin Vejman, Litomysl (CZ)

(73) Assignee: Cisco Technology, Inc., San Jose, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 18/088,284

(22) Filed: Dec. 23, 2022

(65) Prior Publication Data

US 2023/0129786 A1    Apr. 27, 2023

Related U.S. Application Data

(63) Continuation of application No. 16/912,471, filed on Jun. 25, 2020, now Pat. No. 11,539,721, which is a (Continued)

(51) Int. Cl.
*H04L 29/06* (2006.01)
*G06F 21/44* (2013.01)
(Continued)

(52) U.S. Cl.
CPC .......... *H04L 63/1416* (2013.01); *G06F 21/44* (2013.01); *G06F 21/52* (2013.01);
(Continued)

(58) Field of Classification Search
None
See application file for complete search history.

(56) References Cited

U.S. PATENT DOCUMENTS 8,910,285 B2    12/2014   Kolbitsch et al.
9,100,320 B2 *   8/2015   Hsy ......................... H04L 43/14
(Continued)

FOREIGN PATENT DOCUMENTS

WO    WO-2017108575 A1    6/2017

OTHER PUBLICATIONS

"Advanced Malware Protection: A Buyer's Guide", http://informationsecurity.report/Resources/Whitepapers/6df58cb5-f79f-4e5c-82fd-d3e5663aa494_advanced-malware-protection-buyers-guide-pdf-1-w-2078.pdf, 7 pages, May 2016, Cisco.
(Continued)

*Primary Examiner* — Shin-Hon (Eric) Chen
(74) *Attorney, Agent, or Firm* — Lee & Hayes, P.C.; James M. Behmke (57) ABSTRACT

In one embodiment, a service receives traffic telemetry data regarding encrypted traffic sent by an endpoint device in a network. The service analyzes the traffic telemetry data to infer characteristics of an application on the endpoint device that generated the encrypted traffic. The service receives, from a monitoring agent on the endpoint device, application telemetry data regarding the application. The service determines that the application is evasive malware based on the characteristics of the application inferred from the traffic telemetry data and on the application telemetry data received from the monitoring agent on the endpoint device. The service initiates performance of a mitigation action in the network, after determining that the application on the endpoint device is evasive malware.

20 Claims, 10 Drawing Sheets

Related U.S. Application Data continuation of application No. 15/848,150, filed on Dec. 20, 2017, now Pat. No. 10,735,441.

(51) Int. Cl.
  *G06F 21/52* (2013.01)
  *G06F 21/55* (2013.01)
  *H04L 9/32* (2006.01)
  *H04L 9/40* (2022.01)

(52) U.S. Cl.
  CPC .......... *G06F 21/554* (2013.01); *H04L 9/3242* (2013.01); *H04L 63/0876* (2013.01); *H04L 63/1425* (2013.01); *H04L 63/1466* (2013.01); *G06F 21/55* (2013.01); *H04L 63/0428* (2013.01)

(56) References Cited

U.S. PATENT DOCUMENTS

| | | | |
|---|---|---|---|
| 9,215,239 B1 | 12/2015 | Wang et al. | |
| 2011/0302656 A1* | 12/2011 | El-Moussa | H04L 63/1416 |
| | | | 726/24 |
| 2013/0160119 A1* | 6/2013 | Sartin | G06F 21/552 |
| | | | 726/23 |
| 2016/0006755 A1* | 1/2016 | Donnelly | H04L 63/18 |
| | | | 726/1 |
| 2017/0223032 A1 | 8/2017 | El-Moussa | |
| 2018/0131711 A1* | 5/2018 | Chen | H04L 43/026 |
| 2018/0341494 A1* | 11/2018 | Sood | G06F 9/3885 |
| 2018/0375882 A1* | 12/2018 | Kallos | G06F 21/566 |
| 2019/0012457 A1* | 1/2019 | El-Moussa | G06F 21/55 |
| 2019/0068474 A1* | 2/2019 | Vasseur | H04L 41/142 |
| 2019/0149396 A1* | 5/2019 | Zafer | H04L 41/0654 |
| | | | 709/224 |
| 2019/0207955 A1* | 7/2019 | El-Moussa | H04L 63/1408 |

OTHER PUBLICATIONS

"Detecting Advanced Threats and Evasive Malware with Symantec Cynic™", White Paper: Symantec™ Advanced Threat Protection, https://www.pax8.com/resource/display/2496/, 9 pages, 2016, Symantec Corporation.

Anderson, Blake et al., "Identifying Encrypted Malware Traffic With Contextual Flow Data", Artificial Intelligence and Security, ACM, 2 Penn Plaza, Suite 701, New York, NY 10121-0701 USA, Oct. 28, 2016, pp. 35-46.

International Search Report and Written Opinion issued Feb. 15, 2019 in connection with PCT/US2018/063774.

\* cited by examiner

CORRELATING ENDPOINT AND NETWORK VIEWS TO IDENTIFY EVASIVE APPLICATIONS

RELATED APPLICATION

This application is a continuation of U.S. patent application Ser. No. 16/912,471, filed on Jun. 25, 2020 and U.S. patent application Ser. No. 15/848,150, filed on Dec. 20, 2017, both entitled CORRELATING ENDPOINT AND NETWORK VIEWS TO IDENTIFY EVASIVE APPLICATIONS, by Anderson et al., the entire contents of which are incorporated by reference herein.

TECHNICAL FIELD

The present disclosure relates generally to computer networks, and, more particularly, to correlating endpoint and network views to identify evasive applications.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a service receives traffic telemetry data regarding encrypted traffic sent by an endpoint device in a network. The service analyzes the traffic telemetry data to infer characteristics of an application on the endpoint device that generated the encrypted traffic. The service receives, from a monitoring agent on the endpoint device, application telemetry data regarding the application. The service determines that the application is evasive malware based on the characteristics of the application inferred from the traffic telemetry data and on the application telemetry data received from the monitoring agent on the endpoint device. The service initiates performance of a mitigation action in the network, after determining that the application on the endpoint device is evasive malware.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors)

result in corresponding constraints on resources such as energy, memory, computational speed and bandwidth.

Figure 1A:
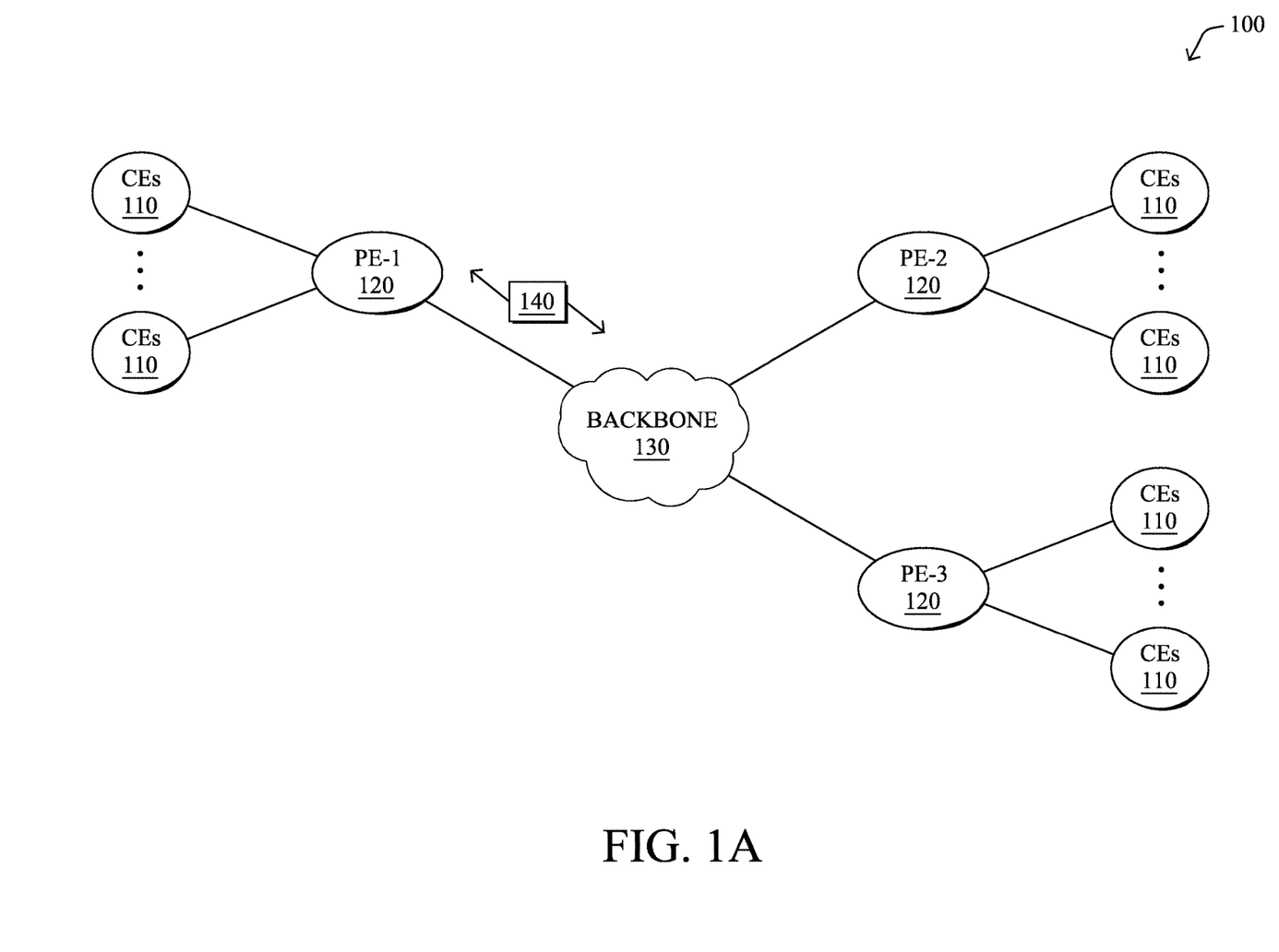
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.
2.) Site Type B: a site connected to the network using two MPLS VPN links (e.g., from different service providers), with potentially a backup link (e.g., a 3G/4G/LTE connection). A site of type B may itself be of different types:
2a.) Site Type B1: a site connected to the network using two MPLS VPN links (e.g., from different service providers), with potentially a backup link (e.g., a 3G/4G/LTE connection).
2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
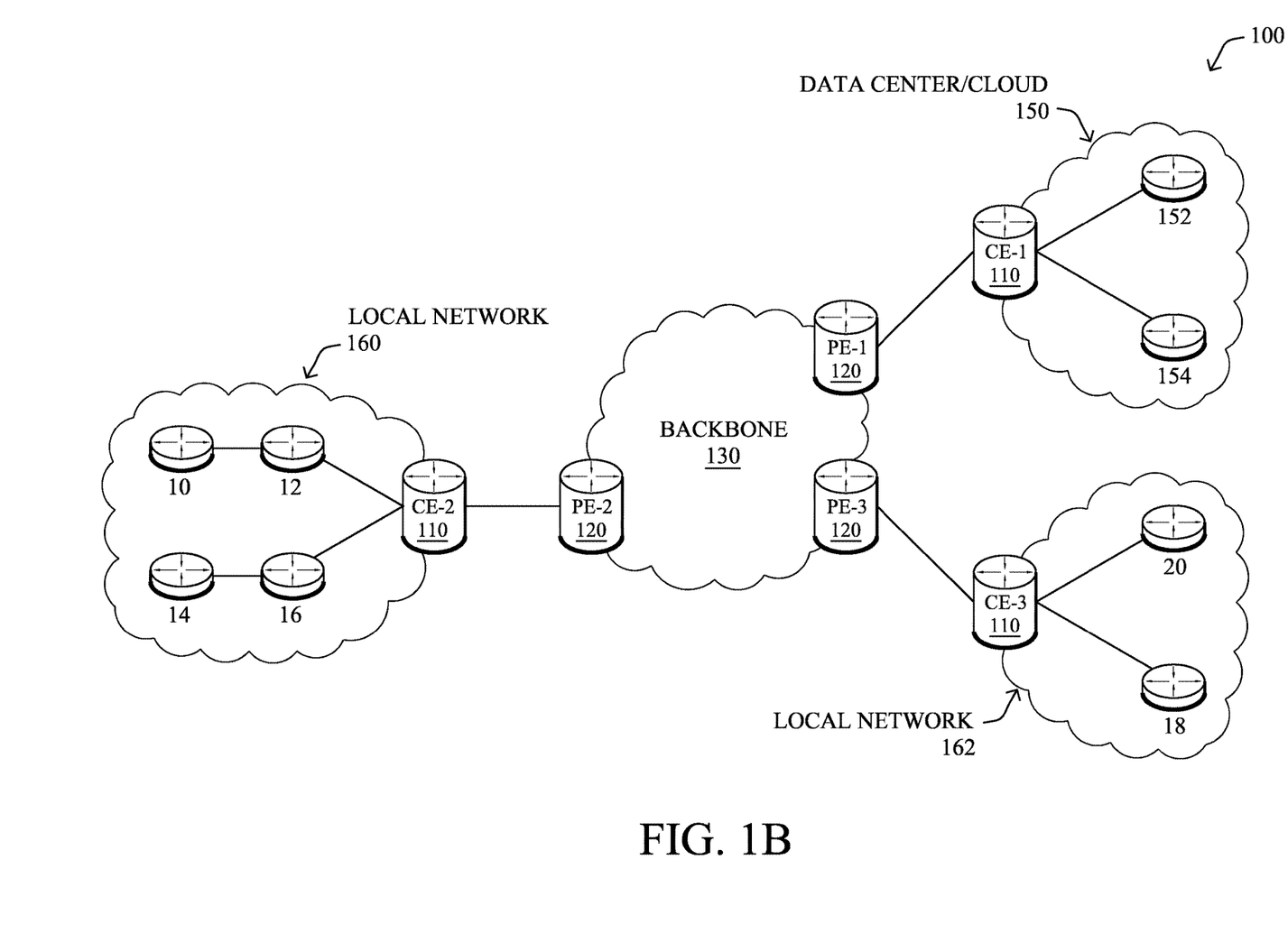

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
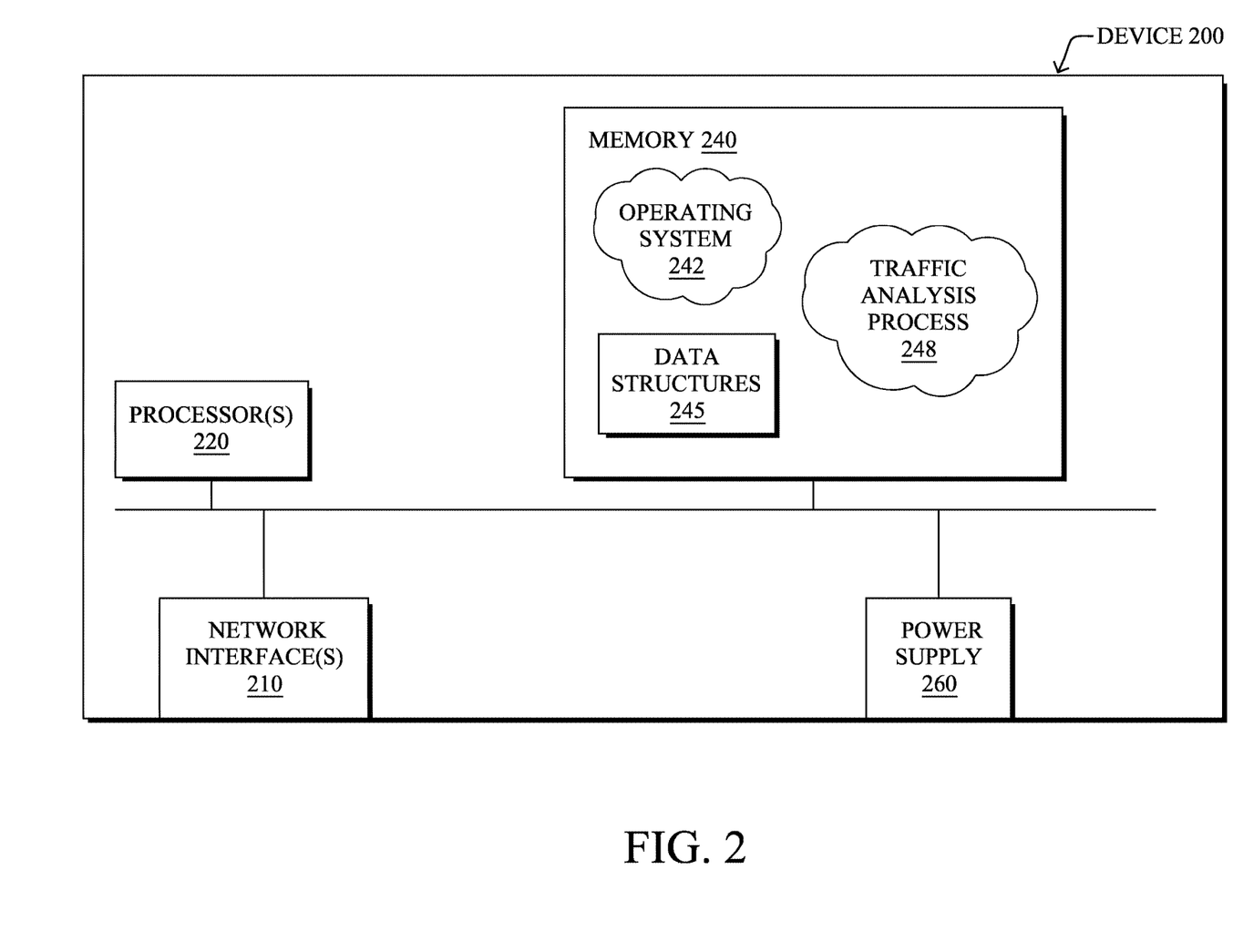
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154

(e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248 and/or a training process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
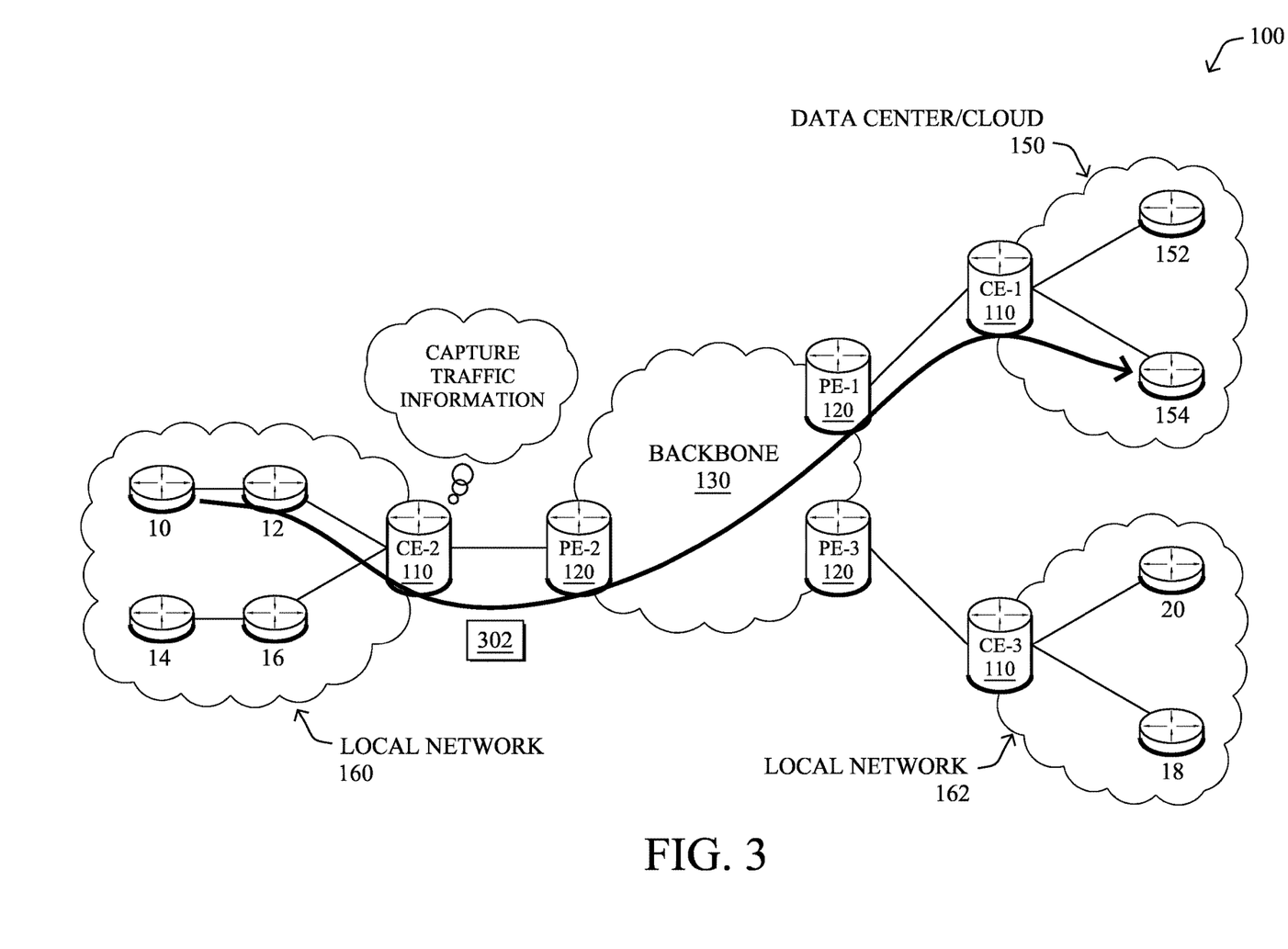
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, traffic analysis process 248 may comprise a machine learning-based classifier that is trained to detect malware based on the captured telemetry data regarding encrypted traffic flows in the network. As part of this detection, traffic analysis process 248 may infer characteristics of the application executing on the endpoint node, based on the captured telemetry data regarding the traffic flow. These characteristics may include, but are not limited to, the identity of the application (e.g., Internet Explorer, Firefox, etc.), the type of application (e.g., web browser, videoconferencing, etc.), and/or application version (e.g., Firefox version 54.0, Internet Explorer version 11, etc.). This information can be used, e.g., to discern between benign encrypted traffic in the network and traffic generated by malware.

While the above techniques are quite effective at identifying malware through the analysis of encrypted network traffic, malicious entities are constantly attempting to create malware that avoids detection. One potential way to avoid detection by a traffic classifier would be to mimic the traffic behavior of common, trusted applications that typically generate benign encrypted traffic in a network. For example, malware could conceivably be created that generates encrypted traffic that looks very similar to traffic from a particular type/version of web browser or other trusted application.

Correlating Endpoint and Network Views to Identify Evasive Applications

The techniques herein allows for the detection of evasive malware that attempts to mimic certain traffic parameters of benign applications in a network. In some aspects, a monitoring agent may be executed on an endpoint device in a network that captures application telemetry data regarding the application sending encrypted traffic in the network. In further aspects, a traffic analyzer that infers characteristics of the sending application can correlate and compare these inferences to the reported application telemetry data from the endpoint monitoring agent, to determine whether any discrepancies exist. Such discrepancies are a strong indicator of the presence of evasive malware on the endpoint and, accordingly, can be used to trigger the performance of a mitigation action in the network, such as sending a security alert, blocking the traffic, or the like.

Specifically, according to one or more embodiments of the disclosure as described in detail below, a service receives traffic telemetry data regarding encrypted traffic sent by an endpoint device in a network. The service analyzes the traffic telemetry data to infer characteristics of an application on the endpoint device that generated the encrypted traffic. The service receives, from a monitoring agent on the endpoint device, application telemetry data regarding the application. The service determines that the application is evasive malware based on the characteristics of the application inferred from the traffic telemetry data and on the application telemetry data received from the monitoring agent on the endpoint device. The service initiates performance of a mitigation action in the network, after determining that the application on the endpoint device is evasive malware.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, a traffic analysis service hosted by one or more devices in a network may infer characteristics of the applications and/or libraries used on an endpoint based on the traffic telemetry data captured from the encrypted traffic sent by the endpoint. In some embodiments, the service may also receive application telemetry data from a monitoring agent executing on the endpoint to verify that the inferred characteristics from the traffic telemetry (e.g., the identity of the application, etc.) were correct. Any inconsistencies can then be treated as an indication of evasive malware on the endpoint and the service can initiate the performance of a mitigation action, accordingly.

Figure 4A:
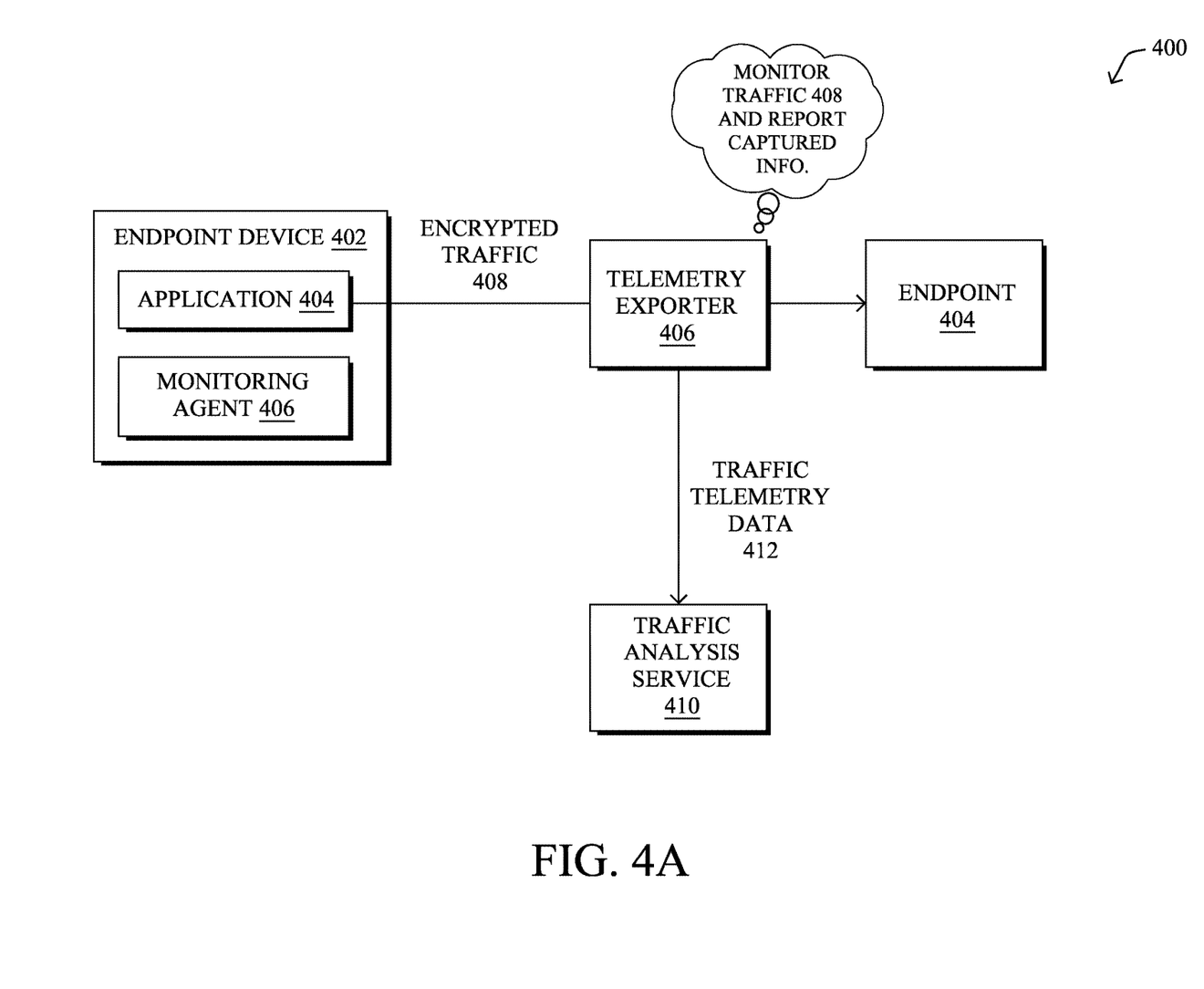
FIGS. 4A-4E illustrate an example of correlating endpoint and network views to identify evasive applications.

FIGS. 4A-4E illustrate an example of correlating endpoint and network views to identify evasive applications, according to various embodiments. As shown in FIG. 4A, assume that a network 400 includes an endpoint device 402 that communicates with another remote endpoint 404. For example, in many cases, endpoint device 402 may be a client device that communicates with a remote server or service via network 400. More specifically, endpoint device 402 may execute an application 404 that generates and exchanges encrypted traffic 408 with endpoint 404 via network 400.

Located along the network path between endpoint device 402 and endpoint 404 may be any number of telemetry exporters, such as telemetry exporter 406 shown. For example, telemetry exporter 406 may be a switch, router, firewall, server, network controller, or other networking equipment via which encrypted traffic 408 sent between endpoint device 402 end endpoint 404 flows. During operation, traffic telemetry exporter 406 may capture data regarding encrypted traffic 408, generate traffic telemetry data 412 based on the captured data, and send traffic telemetry data 412 to traffic analysis service 410 for assessment. For example, traffic telemetry data 412 may include Internet Protocol Flow Information Export (IPFIX) records and/or Netflow records regarding encrypted traffic 408.

In various embodiments, network 400 may also include a traffic analysis service 410 that is implemented by one or more devices in network 400 through the execution of traffic analysis process 248. For example, in some cases, traffic analysis service 410 may be implemented by one or more devices in the local network of endpoint device 402. However, in further cases, traffic analysis service 410 may be implemented as a cloud service that is in communication with telemetry exporter 406 and endpoint device 402, either directly or indirectly.

According to various embodiments, in addition to executing application 404, endpoint device 402 may also execute a monitoring agent 406 that monitors the local operations of endpoint device 402. More specifically, monitoring agent 406 may capture application telemetry data regarding the execution and operation of application 404 on endpoint device 402. For example, monitoring agent 406 may calculate a process hash fingerprint of application 404, may capture information regarding the libraries used by application 404, and/or may capture traffic information regarding encrypted traffic 408, such as size or timing information for the packets of encrypted traffic 408, or the like. Example monitoring applications that may be suitable for performing the tasks herein may include, but are not limited to, Any-Connect Network Visibility Module (NVM) by Cisco Systems, Inc., Advanced Malware Protection (AMP) by Cisco Systems, Inc., Application Performance Management by AppDynamics, certain monitoring functions of the resident operating system, and other suitable monitoring functions.

Figure 4B:
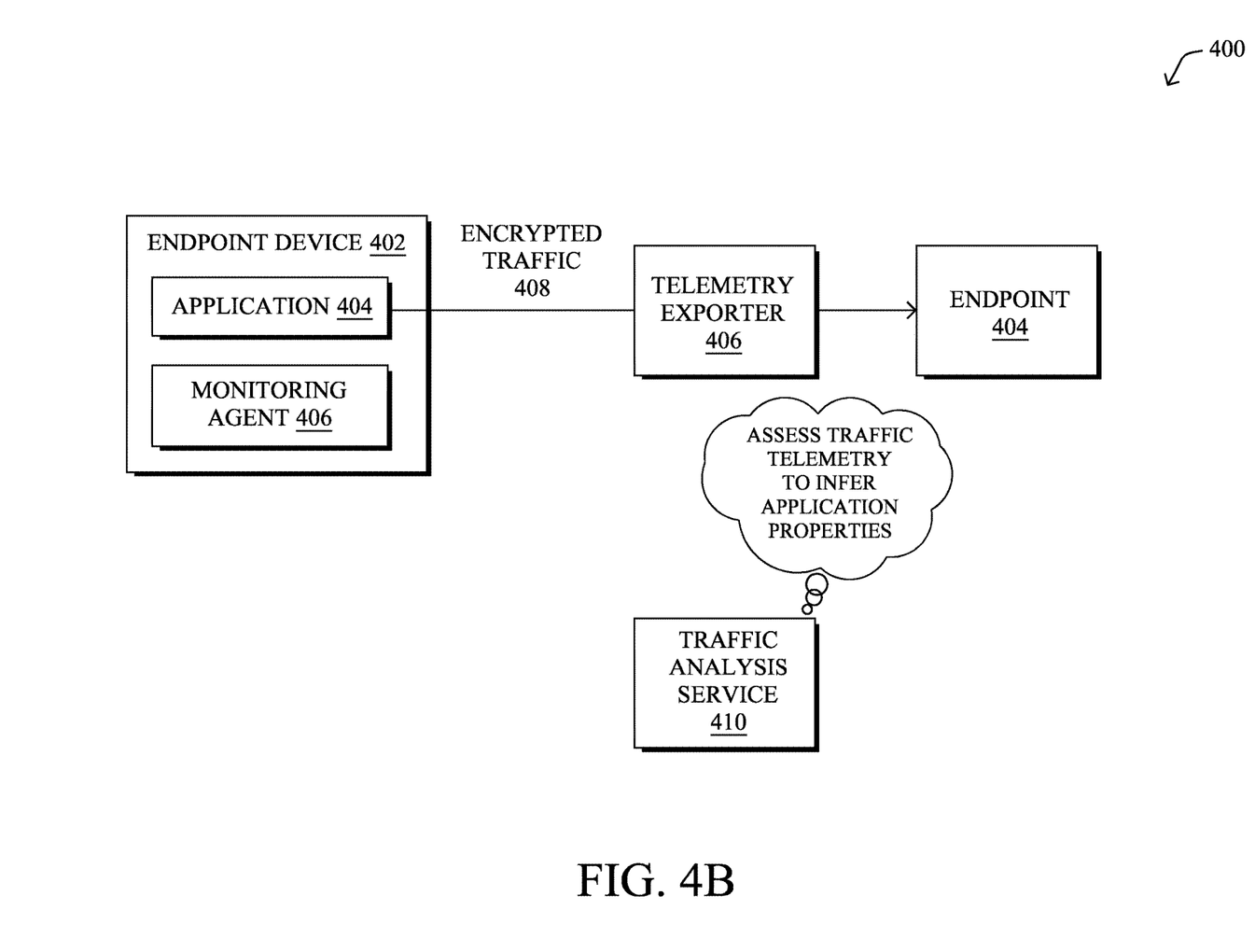

In FIG. 4B, traffic analysis service 410 may assess traffic telemetry data 412 from telemetry exporter 406, to determine whether encrypted traffic 408 was generated by malware on endpoint device 402. Notably, traffic analysis service 410 may infer the characteristics of application 404 from the captured traffic features in traffic telemetry data 412, to determine whether application 404 is malware. For example, as detailed above, traffic analysis service 410 may assess the user agent, TLS parameters, behavioral information (e.g., SPLT data, etc.), or the like, to determine whether encrypted traffic 408 is consistent with a trusted application or known form of malware on which the classifier of traffic analysis service 410 has been trained.

In the case in which traffic analysis service 410 determines that application 404 is malware, traffic analysis service 410 may initiate a mitigation action in network 400. Further, some protocols provide high fidelity signatures (e.g., TLS fingerprints) while others (e.g., HTTP User-Agent) do not always do so. This can also be taken into account by traffic analysis service 410, to ascertain a level of confidence in the inferred characteristics of application 404.

Figure 4C:
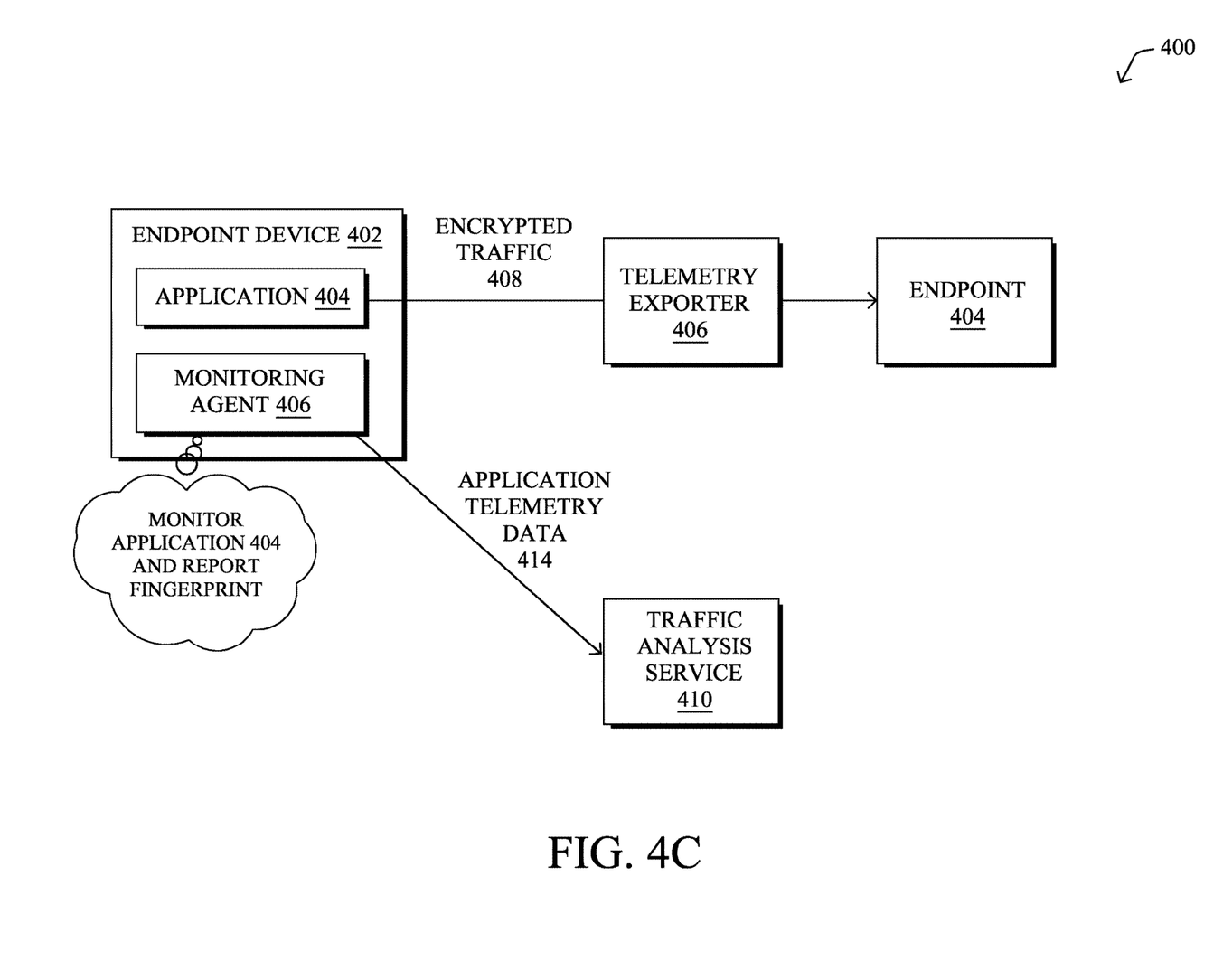

As shown in FIG. 4C, traffic analysis service 410 may also receive application telemetry data 414 from monitoring agent 406. In some embodiments, monitoring agent 406 may supply application telemetry data 414 to traffic analysis service 410 directly. In other embodiments, monitoring agent 406 may receive application telemetry data 414 indirectly from endpoint device 402, such as via an application monitoring service in communication with monitoring agent 406. In addition, application telemetry data 414 may be provided by monitoring agent 406 on either a push or pull basis. For example, in some cases, monitoring agent 406 may first send a request to monitoring agent 406 (either directly or indirectly) to monitoring agent 406 and, in response, monitoring agent 406 may send application telemetry data 414 to traffic analysis process 410.

Figure 4D:
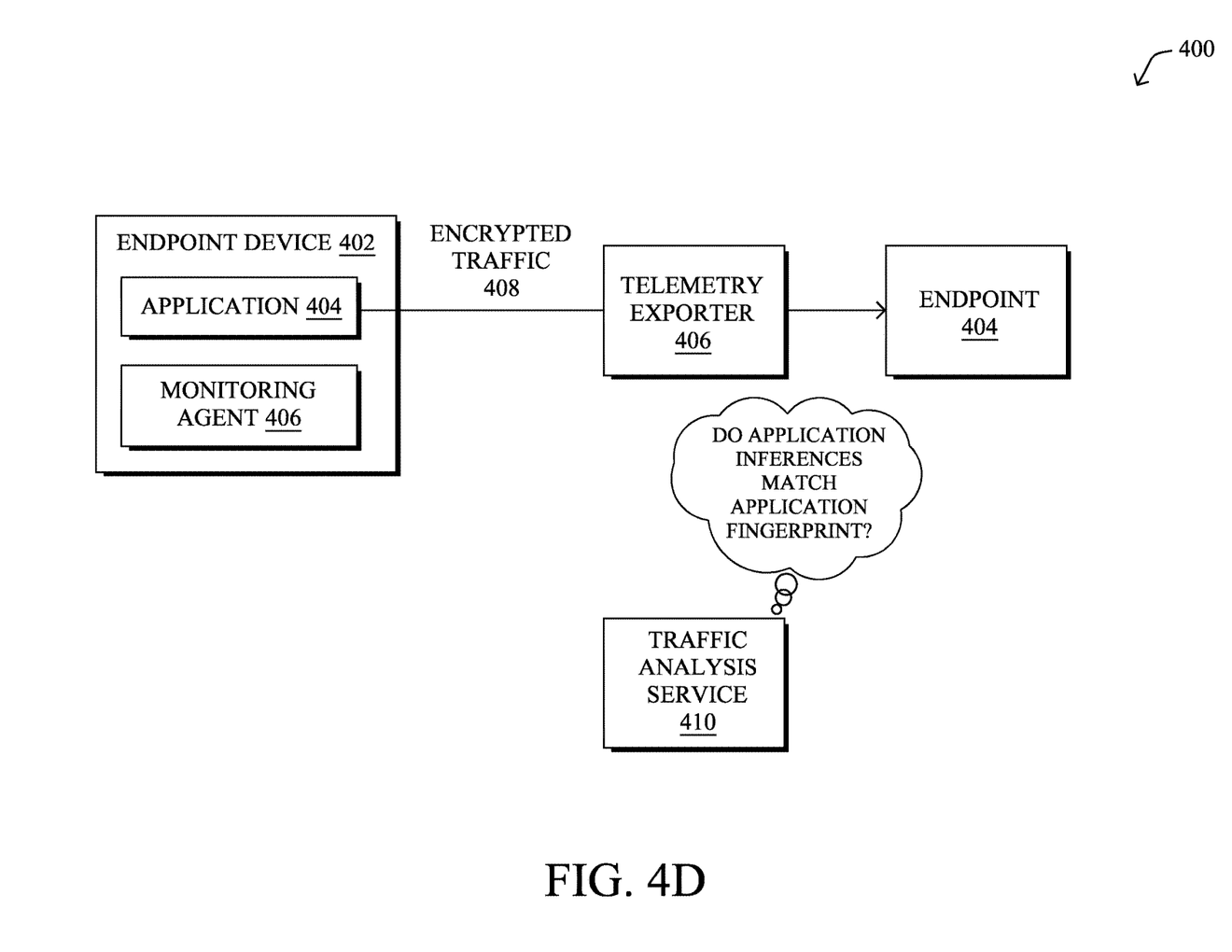

In FIG. 4D, according to various embodiments, traffic analysis service 410 may correlate application telemetry data 414 with the inferred application characteristics of application 404 from traffic telemetry data 412. In turn, traffic analysis service 410 may determine whether application 404 is evasive malware by comparing the inferences from the traffic data to the reported application characteristics from monitoring agent 406. For example, assume that traffic analysis service 410 infers that application 404 is Firefox version 54.0, based on the traffic telemetry data captured from encrypted traffic 408. However, if the process hash fingerprint of application 404 indicates that application 404 is not, in fact, Firefox, traffic analysis service 410 may deem application 404 evasive malware.

In some embodiments, traffic analysis service 410 can also identify tampering with endpoint device 402 by correlating other aspects of the traffic flow data, e.g., the outbound bytes and application layer protocol indicated in traffic telemetry data 412, with the flows records of application telemetry data 414 exported directly by endpoint device 402. Notably, some evasive malware may also attempt to either delete local records of its operation or alter these records on the hosting device. For example, if application 404 is malware, it may attempt to misrepresent the characteristics of the encrypted traffic 408 in a local log of endpoint device 404. However, any discrepancy between these local logs and the observed traffic characteristics may by treated by traffic analysis service 410 as an indication that application 404 is acting evasively and is likely malware.

Figure 4E:
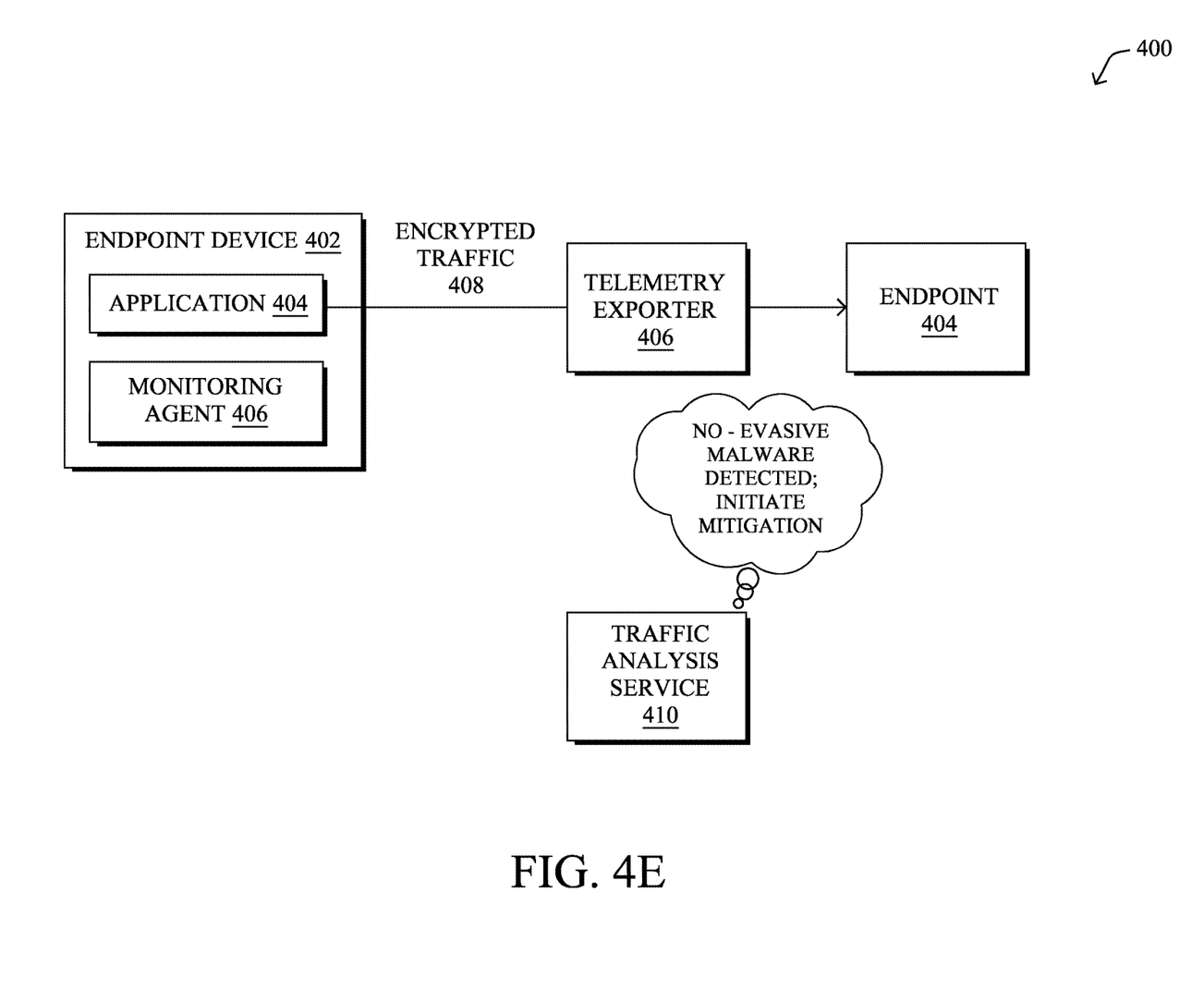

In FIG. 4E, if traffic analysis service 410 determines that application 404 is evasive malware traffic analysis service 410 may initiate any number of mitigation actions in network 400. For example, traffic analysis service 410 may send an alert regarding endpoint device 402 to a security service, to a network administrator, and/or even to the user of endpoint device 402. In further cases, traffic analysis service 410 may initiate a change in network 400 itself, such as by causing traffic associated with endpoint device 402 to be blocked, receive a lower traffic priority, or be rerouted, based on the determination that endpoint device 402 is infected with malware.

Figure 5:
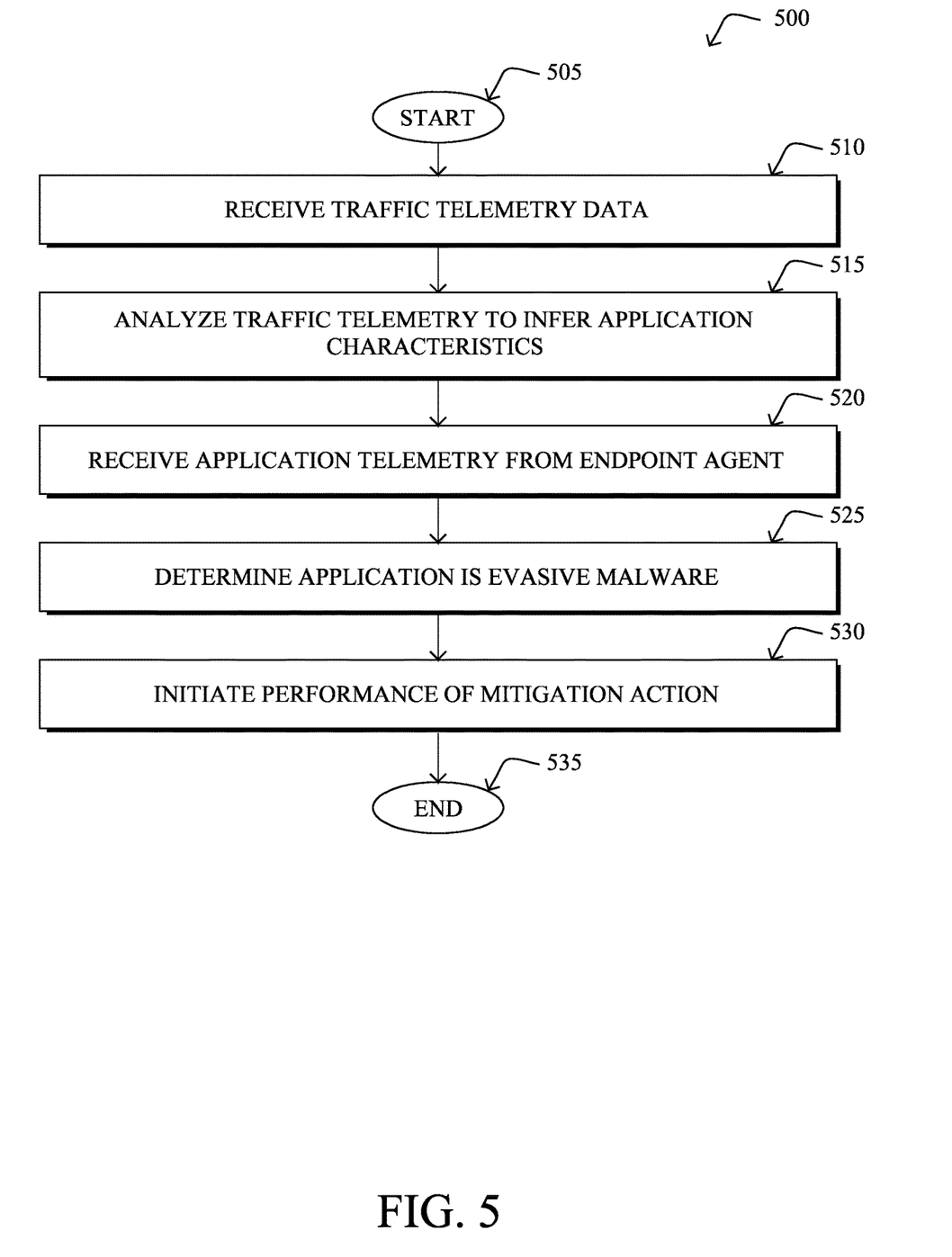
FIG. 5 illustrates an example simplified procedure for correlating endpoint and network views to identify evasive applications.

FIG. 5 illustrates a simplified procedure 500 for correlating endpoint and network views to identify evasive applications, in accordance with one or more embodiments described herein. For example, a non-generic, specifically configured device (e.g., device 200) may perform procedure 500 by executing stored instructions (e.g., process 248), to implement a traffic analysis service. The procedure 500 may start at step 505, and continues to step 510, where, as described in greater detail above, the service may receive traffic telemetry data regarding encrypted traffic sent by an endpoint device in a network. Such telemetry data may indicate the characteristics of the encrypted traffic such as, but not limited to, the user agent, ciphersuite, other TLS parameters, flow behavioral information (e.g., SALT data, SPLT data, etc.), protocols in use, ports, and/or any other information that can be captured regarding an encrypted traffic flow.

At step 515, as detailed above, the service may analyze the traffic telemetry data to infer characteristics of an application on the endpoint device that generated the encrypted traffic. In some embodiments, the service may execute a machine learning-based classifier that has been trained using traffic samples from any number of different applications, to analyze the traffic telemetry data. For example, such a classifier may be trained to identify a particular version of a web browser, based on its exhibited encrypted traffic. Example application characteristics may include, but are not limited to, an application type associated with the application, the identity of the application (e.g., Internet Explorer, Firefox, etc.), the application version, and/or any other characteristics that can be inferred from the traffic generated by the application.

At step 520, the service may receive, from a monitoring agent on the endpoint device, application telemetry data regarding the application, as described in greater detail above. This telemetry data may include, for example, a process hash fingerprint of the application executing on the endpoint device, information regarding when, where, and how the application sends encrypted traffic from the endpoint device, and/or any other information regarding the executing application.

At step 525, as detailed above, the service may determine that the application is evasive malware based on the characteristics of the application inferred from the traffic telemetry data and on the application telemetry data received from the monitoring agent on the endpoint device. For example, in some embodiments, the service may compare the inferred identify of the application from the traffic analysis to the application process hash fingerprint sent by the local monitoring agent on the endpoint. If the service determines that there is a discrepancy, the service may deem this discrepancy an indication that the application is evasive malware. Likewise, if the traffic characteristics of the application traffic from the monitoring agent do not match that observed in the network itself, the service may deem the application to be evasive malware.

At step 535, the service may initiate performance of a mitigation action in the network, as described in greater detail above. Notably, after determining that the application on the endpoint device is evasive malware, the service may generate and send an alert regarding the endpoint, may initiate a change in how the network processes traffic associated with the endpoint (e.g., by blocking/dropping traffic, rerouting traffic, etc.), or cause the performance of any other corrective measure. Procedure 500 then ends at step 540.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of malware that seeks to evade detection by an encrypted traffic analyzer. In particular, the techniques herein can be used to identify malware that is attempting to appear as an otherwise trusted application, from a behavioral standpoint.

While there have been shown and described illustrative embodiments that provide for correlating endpoint and network views to identify evasive applications, it is to be understood that various other adaptations and modifications may be made within the spirit and scope of the embodiments herein. For example, while certain embodiments are described herein with respect to using certain machine learning-based models for purposes of malware detection, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

extracting, at a service, one or more Transport Layer Security (TLS)-based features from encrypted traffic sent by an endpoint device in a network;

analyzing, by the service, the one or more extracted TLS-based features to infer an identity of an application on the endpoint device that sent the encrypted traffic;

receiving, at the service and from a monitoring agent on the endpoint device, application telemetry data regarding the application;

determining, by the service, that the application is malware based on the identity of the application inferred from the one or more extracted TLS-based features and on the application telemetry data received from the monitoring agent on the endpoint device by:

determining an identity of the application based on the application telemetry data received from the monitoring agent on the endpoint device, and comparing the identity of the application determined based on the application telemetry data with the identity of the application inferred from the one or more extracted TLS-based features; and initiating, by the service, performance of a mitigation action in the network, after determining that the application on the endpoint device is malware.

2. The method as in claim 1, wherein the mitigation action comprises at least one of: blocking the encrypted traffic or generating an alert regarding the endpoint device.

3. The method as in claim 1, wherein the application telemetry data comprises a process hash fingerprint of the application.

4. The method as in claim 1, further comprising:
verifying, by the service, that the identity of the application inferred from the one or more extracted TLS-based features is correct based on comparing the identity of the application determined based on the application telemetry data with the identity of the application inferred from the one or more extracted TLS-based features.

5. The method as in claim 1, further comprising:
determining, by the service, that the application is malware when the identity of the application determined based on the application telemetry data is inconsistent with the identity of the application inferred from the one or more extracted TLS-based features.

6. The method as in claim 1, wherein receiving, from the monitoring agent on the endpoint device, the application telemetry data regarding the application comprises:
sending, by the service, a request to the monitoring agent for the application telemetry data; and
receiving, at the service, the application telemetry data, in response to the request.

7. The method as in claim 1, wherein the extracting of the one or more TLS-based features from the encrypted traffic comprises:
analyzing, by the service, packet headers of the encrypted traffic sent by the endpoint device to extract the one or more TLS-based features.

8. An apparatus, comprising:
one or more network interfaces to communicate with a network;
a processor coupled to the one or more network interfaces and configured to execute one or more processes; and
a memory configured to store a process executable by the processor, the one or more processes when executed configured to:
extract one or more Transport Layer Security (TLS)-based features from encrypted traffic sent by an endpoint device in a network;
analyze the one or more extracted TLS-based features to infer an identity of an application on the endpoint device that sent the encrypted traffic;
receive, from a monitoring agent on the endpoint device, application telemetry data regarding the application;
determine that the application is malware based on the identity of the application inferred from the one or more extracted TLS-based features and on the application telemetry data received from the monitoring agent on the endpoint device by:
determining an identity of the application based on the application telemetry data received from the monitoring agent on the endpoint device, and
comparing the identity of the application determined based on the application telemetry data with the identity of the application inferred from the one or more extracted TLS-based features; and
initiate performance of a mitigation action in the network, after determining that the application on the endpoint device is malware.

9. The apparatus as in claim 8, wherein the mitigation action comprises at least one of: blocking the encrypted traffic or generating an alert regarding the endpoint device.

10. The apparatus as in claim 8, wherein the application telemetry data comprises a process hash fingerprint of the application.

11. The apparatus as in claim 8, wherein the one or more processes when executed are further configured to:
verify that the identity of the application inferred from the one or more extracted TLS-based features is correct based on comparing the identity of the application determined based on the application telemetry data with the identity of the application inferred from the one or more extracted TLS-based features.

12. The apparatus as in claim 8, wherein the one or more processes when executed are further configured to:
determine that the application is malware when the identity of the application determined based on the application telemetry data is inconsistent with the identity of the application inferred from the one or more extracted TLS-based features.

13. The apparatus as in claim 8, wherein the apparatus receives, from the monitoring agent on the endpoint device, the application telemetry data regarding the application by:
sending a request to the monitoring agent for the application telemetry data; and
receiving the application telemetry data, in response to the request.

14. The apparatus as in claim 8, wherein the apparatus extracts the one or more TLS-based features from the encrypted traffic by:
analyzing packet headers of the encrypted traffic sent by the endpoint device to extract the one or more TLS-based features.

15. A tangible, non-transitory, computer-readable medium that stores program instructions causing a service to execute a process comprising:
extracting, at a service, one or more Transport Layer Security (TLS)-based features from encrypted traffic sent by an endpoint device in a network;
analyzing, by the service, the one or more extracted TLS-based features to infer an identity of an application on the endpoint device that sent the encrypted traffic;
receiving, at the service and from a monitoring agent on the endpoint device, application telemetry data regarding the application;
determining, by the service, that the application is malware based on the identity of the application inferred from the one or more extracted TLS-based features and on the application telemetry data received from the monitoring agent on the endpoint device by:
determining an identity of the application based on the application telemetry data received from the monitoring agent on the endpoint device, and
comparing the identity of the application determined based on the application telemetry data with the identity of the application inferred from the one or more extracted TLS-based features; and
initiating, by the service, performance of a mitigation action in the network, after determining that the application on the endpoint device is malware.

16. The tangible, non-transitory, computer-readable medium as in claim 15, wherein the mitigation action comprises at least one of: blocking the encrypted traffic or generating an alert regarding the endpoint device.

17. The tangible, non-transitory, computer-readable medium as in claim 15, wherein the application telemetry data comprises a process hash fingerprint of the application.

18. The tangible, non-transitory, computer-readable medium as in claim 15, wherein the process further comprises:
   verifying, by the service, that the identity of the application inferred from the one or more extracted TLS-based features is correct based on comparing the identity of the application determined based on the application telemetry data with the identity of the application inferred from the one or more extracted TLS-based features.

19. The tangible, non-transitory, computer-readable medium as in claim 15, wherein the process further comprises:
   determining, by the service, that the application is malware when the identity of the application determined based on the application telemetry data is inconsistent with the identity of the application inferred from the one or more extracted TLS-based features.

20. The tangible, non-transitory, computer-readable medium as in claim 15, wherein receiving, from the monitoring agent on the endpoint device, the application telemetry data regarding the application comprises:
   sending, by the service, a request to the monitoring agent for the application telemetry data; and
   receiving, at the service, the application telemetry data, in response to the request.

\* \* \* \* \*